United States Patent
Koehler

[15] 3,636,815
[45] Jan. 25, 1972

[54] SURFACE CUTTING MACHINE TOOL

[72] Inventor: Walter Koehler, Guetersloh, Westfalen, Germany

[73] Assignee: IMA Klessmann, Guetersloh, Germany

[22] Filed: Nov. 5, 1969

[21] Appl. No.: 874,107

[52] U.S. Cl. .................................................90/38, 90/53
[51] Int. Cl. ................................................................B23d 1/18
[58] Field of Search......................90/38, 78, 53, 34, 37; 83/201.04, 201.05, 201.06, 201.07

[56] References Cited

UNITED STATES PATENTS

| 445,644 | 2/1891 | Kellow | 90/38 |
| 1,447,422 | 3/1923 | McCann | 90/37 |
| 2,829,565 | 4/1958 | Ungerer | 90/78 X |

Primary Examiner—Gil Weidenfeld
Attorney—Erich M. Radde, Charles A. McClure, Gerard J. Weiser and Alfred Stapler

[57] ABSTRACT

This invention is directed to a planar type of machine tool in which a plurality of cutting tools are individually mounted on the respective links of continuously driven endless chain that is bodily oscillatable about an axis transverse to the path of travel of the workpiece so that the cutting tools on one flight of the chain engage the workpiece during one direction of travel thereof and the cutting tools on the other flight of the chain engage the workpiece during its opposite direction of travel. The workpiece is progressively pivoted in one direction as it is advanced and progressively pivoted in the opposite directions as it is returned so that the tool cuts will be in straight lines substantially parallel to the sides of the workpiece.

6 Claims, 7 Drawing Figures

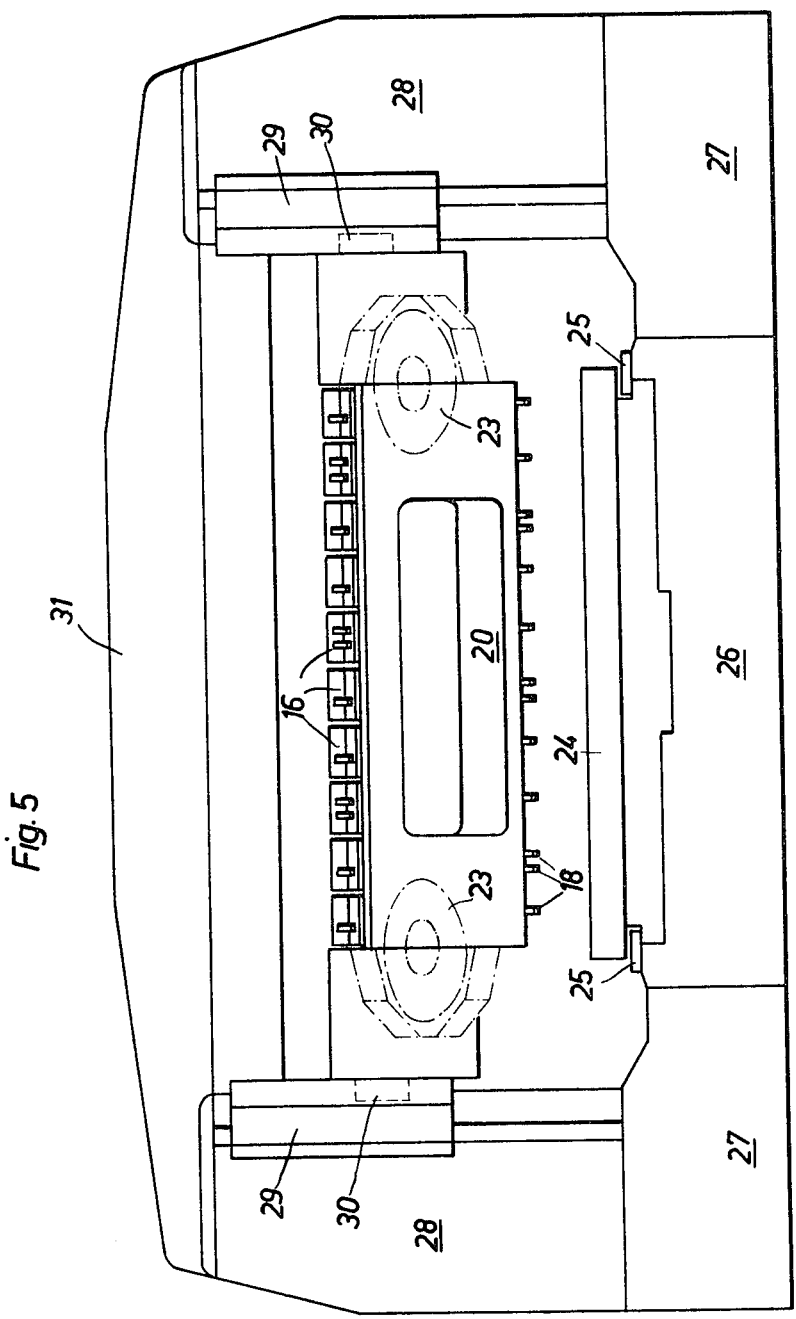

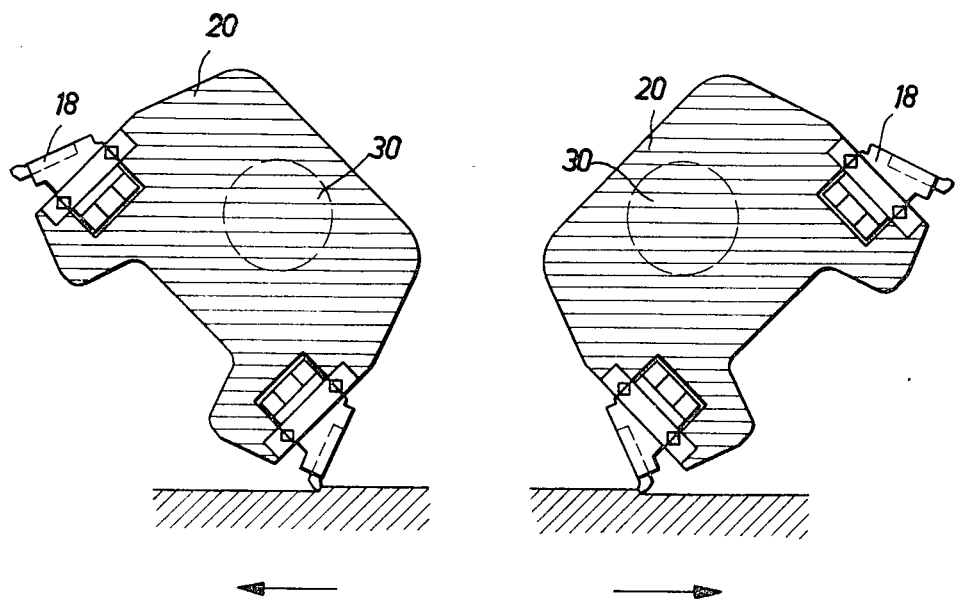
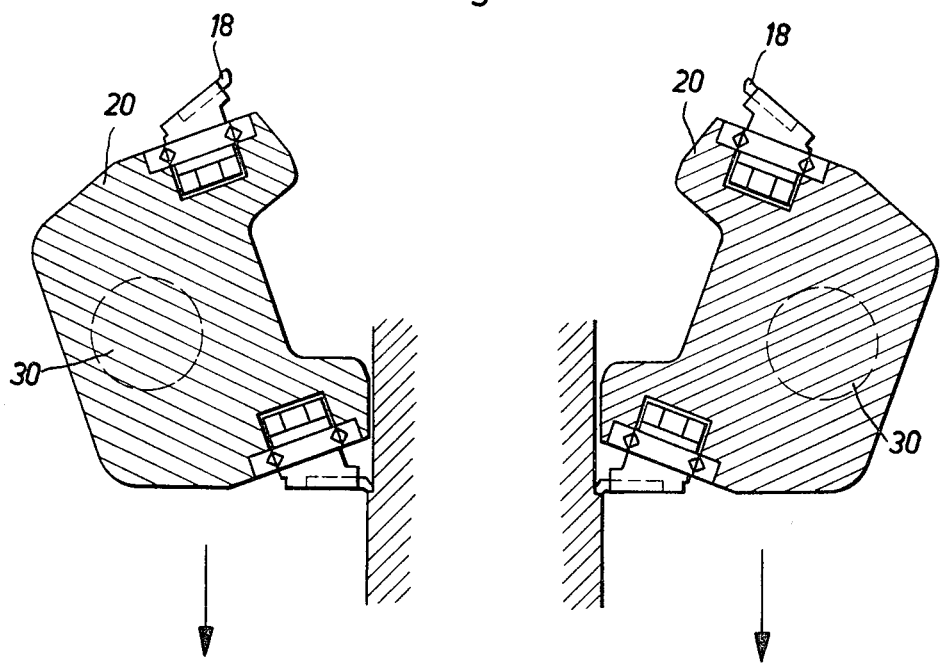
Fig. 7

SURFACE CUTTING MACHINE TOOL

BACKGROUND OF THE INVENTION

1. Field of the Invention

This invention relates generally to new and useful improvements in cutting types of machine tools and particularly seeks to provide a novel planer type of cutting machine that includes a plurality of transversely aligned, simultaneously operable, cutting tools individually mounted on the respective links of a continuously moving endless chain that is bodily oscillatable about an axis that is at a right angle to the direction of cut so that the cutting tools on one flight of the chain engage the workpiece during one direction of travel thereof and the cutting tools on the other flight of the chain engage the workpiece during its opposite direction of travel.

2. Description of the Prior Art

The removal of metal from plane surfaces is usually carried out by planers, shapers, or millers. In planing machines the cutting tool operates along straight lines in rectilinear motion. Therefore, either the cutting tool or the workpiece must be reciprocated. As a result thereof, it is necessary to successively accelerate and decelerate either the entire mass of workpiece and carriage or the tool with its carriage. When operating standard planers with only one cutting tool, cutting takes place only during the forward stroke, while the return is an idle or lost stroke. Of course, there are also known more modern planers in which the workpiece is machined during both the forward and the return strokes. Such planers are provided with two cutting tools facing in opposite directions. The workpiece with its slide or carriage reciprocates back and forth in such machine tools. However, even in such planers the workpiece with its platen must be accelerated and decelerated during each cutting stroke. Furthermore, during acceleration to cutting speed the joltlike stress or shock loading encountered when the workpiece first meets the cutting tool must be overcome.

Surface milling machines with one or more milling wheels which simultaneously cut the workpiece have been constructed for cutting plane surfaces. The chip removal rate of such machines, however, is lower than that of planers and due to the circular movement of the tools a different surface finish of the workpiece is effected. Furthermore, the width of the surface to be cut or planed is limited considerably by the form, shape, or diameter of the milling wheel.

SUMMARY OF THE INVENTION

However, a machine tool constructed in accordance with this invention combines the advantages of planers and surface millers without incurring any of the disadvantages thereof.

Therefore, one object of this invention is to provide a novel machine tool for cutting plane surfaces through the use of plural cutting tools that are simultaneously engageable with a workpiece during each cutting stroke.

Another object of this invention is to provide a machine tool of the character stated in which the cutting tools are individually mounted on the respective links of an endless sprocket-mounted continuously driven chain that extends transversely of the path of travel of the workpiece.

Another object of the present invention is to provide a machine tool of the character stated in which the tool mounting chain is bodily oscillatable about a transverse axis so that the cutting tools on one flight of the chain will engage the workpiece during one direction of travel thereof and the cutting tools on the other flight of the chain engage the workpiece during its opposite direction of travel.

A further object of this invention is to provide a machine tool of the character stated in which means are provided to effect relative lateral movement between the cutting tools and the workpiece so that metal will be removed progressively from the entire face of the workpiece along substantially straight lines that are substantially parallel to the sides of the workpiece.

BRIEF DESCRIPTION OF THE DRAWINGS

With these and other objects, the nature of which will be apparent, the invention will be more fully understood by reference to the drawings, the accompanying detailed description and the appended claims.

In the drawings:

FIG. 5 is a front elevation of a machine tool with the cutter chain installed;

FIGs. 7a to d schematically indicate the different working positions of the cutting tools relative to the workpiece.

Like reference numerals in said Figs. indicate like parts of the machine tool.

DESCRIPTION OF THE PREFERRED EMBODIMENTS

Figure 1:
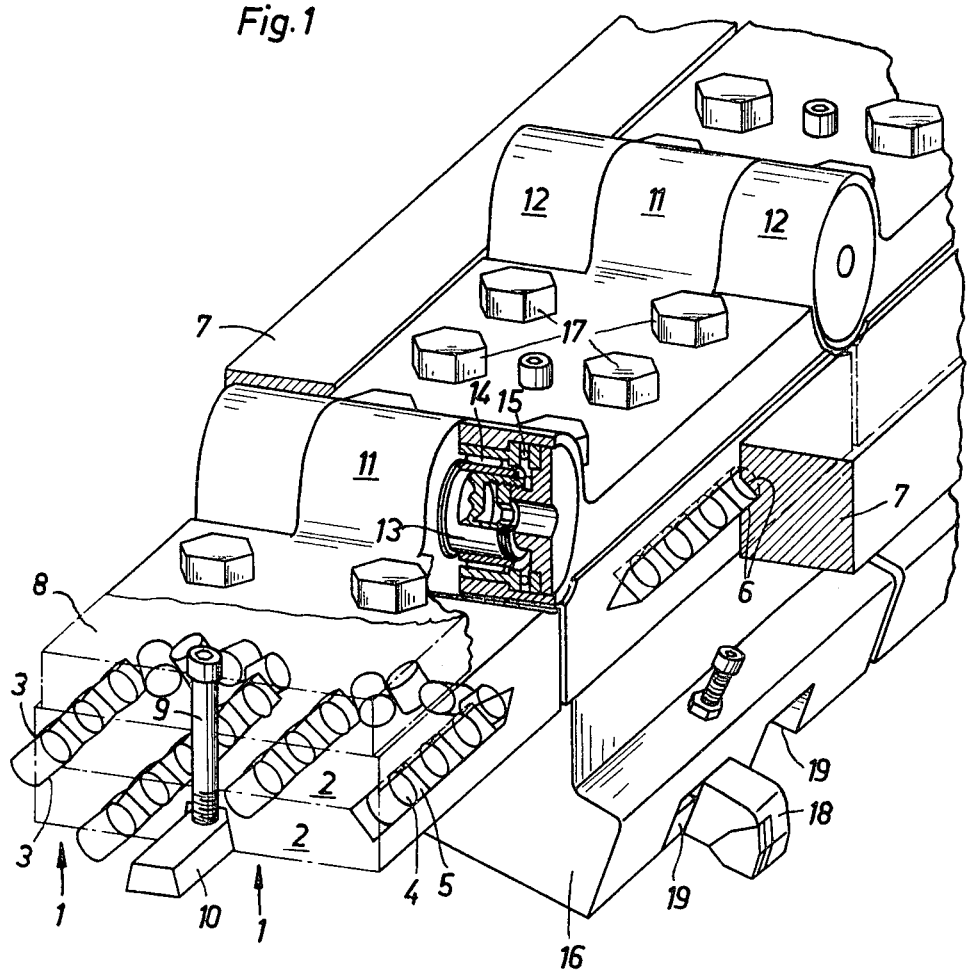
FIG. 1 is an enlarged perspective view, partly in section, of a portion of the cutting tool support chain.
Figure 4:
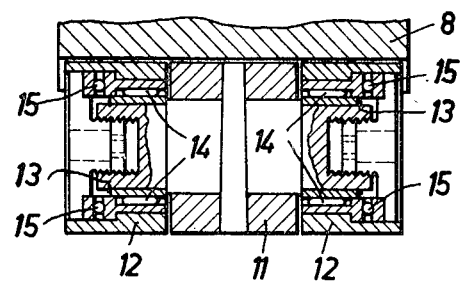
FIG. 4 is a vertical transverse section taken along line IV—IV of FIG. 2.

Referring to the drawings in detail the invention, as illustrated, is embodied in a machine tool that includes a tool carrier formed by the links of a roller bearing-supported endless chain.

More specifically, such roller or antifriction bearing for the endless chain consists essentially of cylindrical rollers having their axes of rotation alternately inclined by 45° with respect to the plane of main extension of the bearing body for engagement with correspondingly inclined guide ways. Such a roller or antifriction bearing is able to transfer forces in all directions on a linear guide way. The bearing bodies of such a roller or antifriction bearing may also be balls and the guideways on which the balls travel may be rods of circular cross section.

Figure 2:
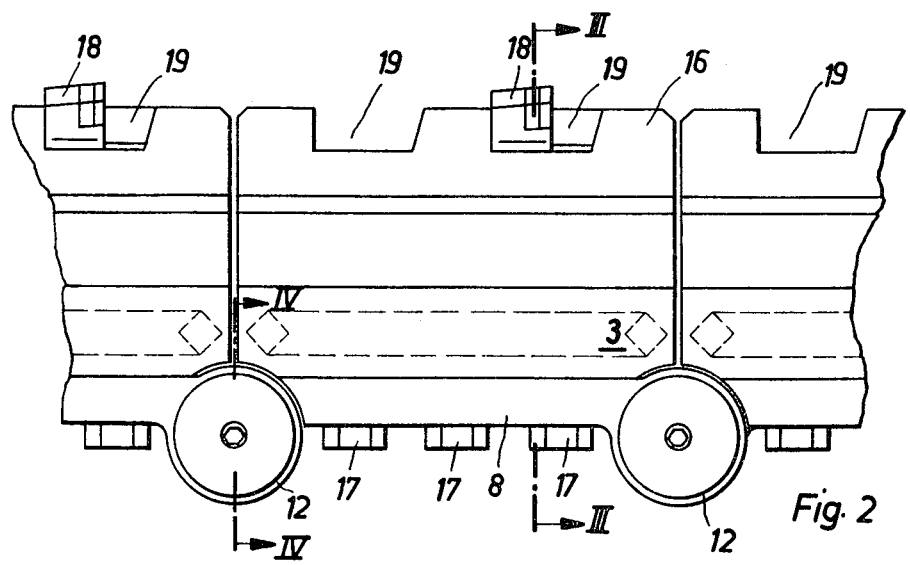
FIG. 2 is a side elevation of that part of the cutting tool support chain shown in FIG. 1.

Referring to FIGS. 1 and 2 of the drawings such a roller or antifriction bearing generally indicated 1 consists of two mating plates 2, 2 which are provided with opposed V-shaped grooves that define guide ways 3 for the cylindrical rollers 4 and 5. The axes of rotation of said cylindrical rollers 4 and 5 are alternately inclined by 45° with respect to the separating plane between the bearing housing plates 2, 2. The cylindrical rollers 4 and 5 extend somewhat from the surface of the housing plates 2, 2 and rest thereon. The lateral edges of the plates 2, 2 are grooved to define guide ways that mate with similar guide ways formed in a pair of stationary guide bars 7, 7 that carry a similar set of rollers.

The adjacent roller or antifriction bearings 1 are firmly clamped to an overlying plate 8 by means of a screw 9 and an opposing clamping plate or chuck jaw 10 located beneath the lower plate 2. The plate 8 is provided at one end with an hinge part 11 and at its other end with hinge parts 12. The bearings 1 with plates 8 form links of a chain which chain links are connected with each other by the interfitted hinge parts 11 and 12 and pintles 13. The pintles 13 are preferably mounted in roller bearings 14 and ball bearings 15, although simple bushings may suffice.

Figure 3:
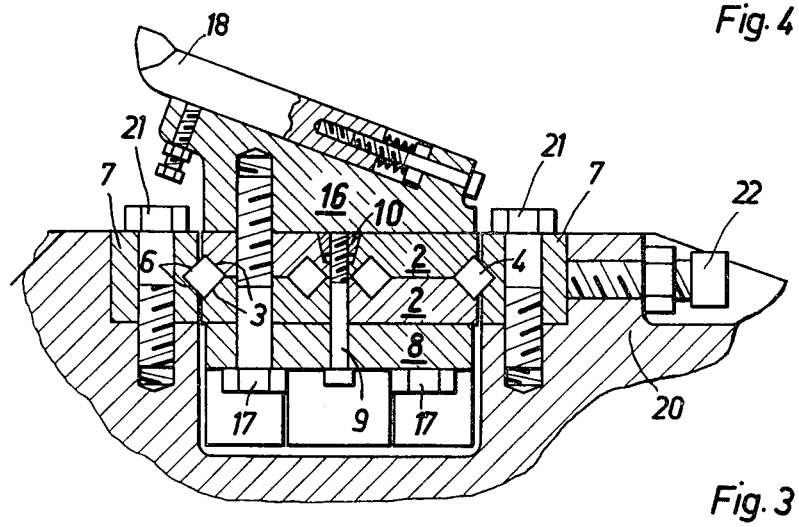
FIG. 3 is a vertical transverse section taken along line III—III of FIG. 2.

On the outside of each chain link adjacent the bottom thereof is mounted a tool holder 16 which carries a cutting tool 18 attached thereto in the usual manner. Preferably two recesses 19 are provided in each tool holder 16 for the cutting tools 18. The stationary guides 7 are fastened by means of screws 21 into a profiled beam of mounting bar 20. They can be set by means of set screws 22 as shown in FIG. 3.

The tool carrier chain constructed as described hereinabove is received by and travels in upper and lower channels formed in the edge of the guide bar 20 and between the parallel stationary guides 7 and around a pair of supporting sprockets or rollers 23 provided at the ends of the guide bar 20. Said return rollers are constructed at their circumference in such a manner that they cooperate positively with the hinge joints 11 and 12. The rollers 23 also incrementally advance the tool carrier chain through suitable motor driven reduction gear means (not shown) mounted on the guide bar 20.

Figure 6:
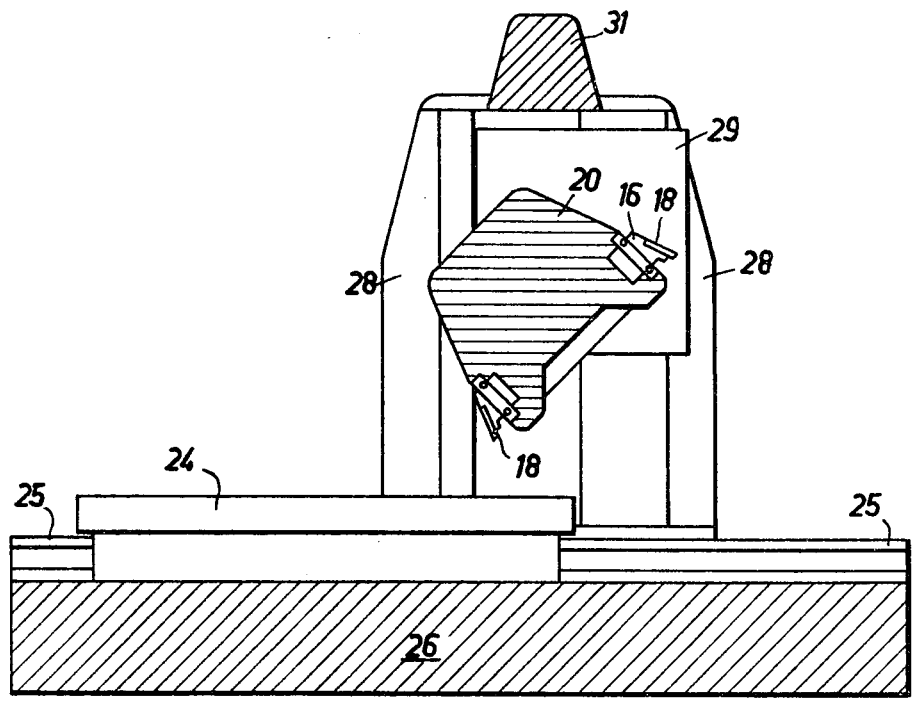
FIG. 6 is a side elevation, partly in section, of the machine tool of FIG. 5.

FIGS. 5 and 6 illustrate an embodiment of a machine tool according to the present invention whereby a workpiece (not illustrated) is set and clamped upon a table 24 that rests on a bed or support 26 in such a manner that it can slide between a pair of parallel guide ways 25, 25. A pair of bottom plates or base plates 27, 27 are arranged at the sides of the bed 26 and carry a pair of lateral uprights or posts 28, 28. The edge-channeled bar 20 is pivotally connected to said lateral uprights 28 by trunnions 30 in guide blocks 29 which are vertically movable. Pivoting of the guide bar 20 may be positively effected in either direction as by any suitable motor driven worm and worm wheel drive (not shown) in which the driving motor and worm is mounted on one of the blocks 29 and the worm wheel is affixed to the associated end of the guide bar 20. The heads of the uprights 28 are connected by means of crossbeam 31 to form a gate.

According to an especially preferred embodiment of the machine tool of the present invention the uprights 28 can be moved on their base plates 27 in guide ways and can be set and adjusted horizontally with respect to the workpiece holder by means of screw jacks or hydraulic cylinders, while the workpiece with its holding or clamping table 24 is fixed to bed or support 26 during machining and cutting. The result of such a construction of the machine tool is that the entire machining and cutting of a workpiece requires only slightly more space for the length of the machine tool than the total length of the workpiece. In contrast thereto the total length of the heretofore used planers amounts to more than twice the length of the workpiece to be machined because the workpiece during machining and cutting had to be advanced by its entire length.

The pivoted mounting of the edge-channeled bar 20 permits the surface machining, as illustrated in FIGS. 7a to d to be carried out by advancing from left to right as well as from right to left, for instance, by correspondingly advancing the workpiece whereby the bar 20 is correspondingly pivoted horizontally from the position at FIG. 7a to the position at FIG. 7b. It is, of course, also possible to advance bar 20 itself by the uprights 28. It is also possible to machine or cut, as shown in FIGS. 7c and 7d to work or machine vertical surfaces of the workpiece whereby the bar 20 is pivoted vertically. This procedure has the further advantage that, when machining or cutting a vertical surface of a workpiece on one side of the machine tool, the machined or cut workpiece can be released on the other side of the machine tool and a new workpiece can be set and clamped thereto so that shutdown time can be shortened considerably. Of course, replacement of the workpiece during machining is also possible when machining or cutting horizontal surfaces provided the workpieces are at the most of half the length of the table 24.

It is evident from the preceding description that a large number of cutting tools 18 are always in machining contact with the workpiece when using the machine tool according to the present invention and that the cutting tools, due to their specific mounting in their mounting support, either can be positioned for high-volume cutting or high-speed cutting. Especially in the last-mentioned case it is possible to achieve a high quality of surface finish of the machined surface which requires only very little subsequent finishing work or none at all. Since continually a large number of cutting tools are in contact with the workpiece, the machining time is considerably reduced in comparison to that required with prior known comparable machine tools. A further advantage over such known machine tools is that considerably less energy is consumed because it is not necessary to continually accelerate and decelerate large masses of workpieces. Thus this machine tool operates also more economically than the known machine tools.

Furthermore, it is evident that this machine tool can readily be constructed in such a manner that the cutting tools attached to the revolving chain can be arranged not only in a straight line one after the other but also vertically and laterally staggered against each other so that their cutting edges define a profile. When adjusting the machine tool in such a manner, it is possible to finish narrow elongated workpieces in a single operation with vertical delivery, whereby the workpieces have the maximum width of the clamping or chucking range of the cutting tools and the maximum length of the straight guide ways 7 of the tools. If necessary, tool holders and cutting tools of special shape can be used for this purpose.

A machine tool according to the present invention furthermore permits duplicating machining, cutting, milling, or the like in a simple manner. For this purpose a pattern template is fastened to the work table. Said pattern template is calipered or scanned by a profile tracer attached to the edge-channeled bar 20. For instance, lathe beds or guides can be produced in this manner.

For special purposes the guide way 7 of each chain link or member with the cutting tools at the guide bar 20 can also be constructed in a lengthwise convex manner in order to produce machined convex or concave surfaces. Cutting tools for rough machining and for finishing may be clamped in position to successive chain links or members so that first one or more coarse chips and thereafter one or more fine chips are removed. Thus the workpiece can be rough-machined, fine-machined, and finished in one mounting and while passing only once through the machine tool.

I claim:

1. A machine tool for cutting plane surfaces including a base, a horizontal workpiece support reciprocably mounted in said base, and a tool carrier mounted above said workpiece support, said tool carrier comprising a transversely extending mounting bar provided adjacent each end with a chain-supporting sprocket, an endless link chain carried by said sprockets, an outwardly extending cutting tool removably affixed to each of at least several of the links of said chain, a tool carrier mounting frame having a pair of spaced posts extending upwardly from said base, a pair of vertically adjustable mounting blocks carried by said posts, and means for pivotally connecting the ends of said tool carrier mounting bar to said mounting blocks.

2. The machine tool of claim 1, in which said transversely extending mounting bar is provided with a pair of spaced parallel oppositely extending channels that slidably receive and retain the parallel straight flights of said endless chain.

3. The machine tool of claim 2, in which each link of said chain includes a block portion adapted to travel within the channels of said mounting bar end which additionally includes roller bearings carried by said block interposed between the lateral walls thereof and the sidewalls of said channels to minimize friction as said chain links may be moved along said channels.

4. The machine tool of claim 3, in which the links of said chain are hingedly connected at the ends of their inward sides.

5. The machine tool of claim 4 in which said endless link chain comprises a series of tool holders in block form which are pivotally connected with each other in the manner of a chain.

6. The machine tool of claim 3 in which said roller bearings are of antifriction type for unlimited displacement paths.

* * * * *

UNITED STATES PATENT OFFICE
CERTIFICATE OF CORRECTION

Patent No. 3,636,815   Dated January 25, 1972

Inventor(s) Walter Koehler

It is certified that error appears in the above-identified patent and that said Letters Patent are hereby corrected as shown below:

On the cover sheet, cancel the illustrated drawing and substitute the attached drawing.

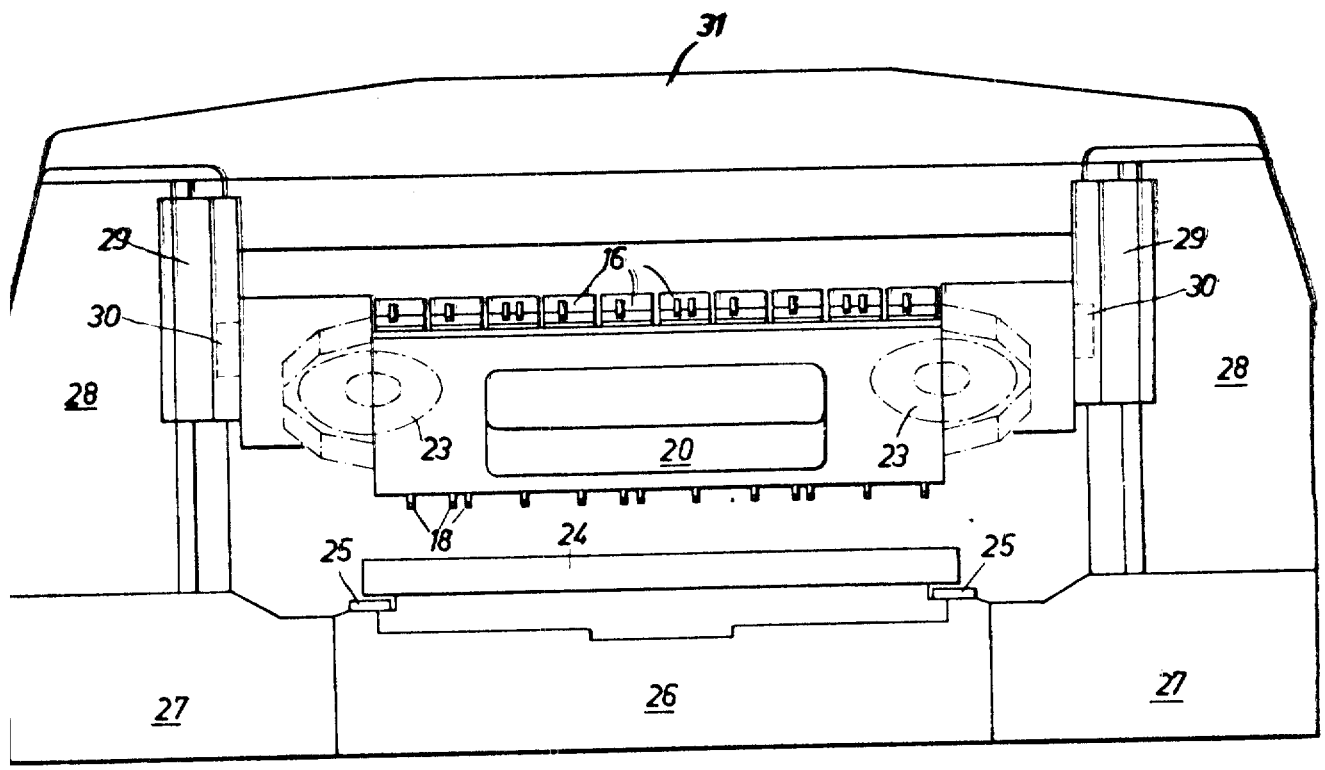

UNITED STATES PATENT OFFICE
CERTIFICATE OF CORRECTION

Patent No. 3,636,815      Dated January 25, 1972

Inventor(s) Walter Koehler     Page 2

It is certified that error appears in the above-identified patent and that said Letters Patent are hereby corrected as shown below:

Signed and sealed this 21st day of November 1972.

(SEAL)
Attest:

EDWARD M. FLETCHER, JR.       ROBERT GOTTSCHALK
Attesting Officer      Commissioner of Patents